(12) United States Patent
Legner

(10) Patent No.: US 10,883,255 B2
(45) Date of Patent: Jan. 5, 2021

(54) TENSILE FORCE-LIMITING DEVICE FOR A WORKING MACHINE

(71) Applicant: ZF Friedrichshafen AG, Friedrichshafen (DE)

(72) Inventor: Jürgen Legner, Friedrichshafen (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 0 days.

(21) Appl. No.: 16/769,599

(22) PCT Filed: Nov. 7, 2018

(86) PCT No.: PCT/EP2018/080429
§ 371 (c)(1),
(2) Date: Jun. 4, 2020

(87) PCT Pub. No.: WO2019/110230
PCT Pub. Date: Jun. 13, 2019

(65) Prior Publication Data
US 2020/0340209 A1 Oct. 29, 2020

(30) Foreign Application Priority Data
Dec. 6, 2017 (DE) .................. 10 2017 221 985

(51) Int. Cl.
*F16H 61/472* (2010.01)
*E02F 9/22* (2006.01)
(Continued)

(52) U.S. Cl.
CPC .......... *E02F 9/2253* (2013.01); *B60K 28/165* (2013.01); *E02F 9/2079* (2013.01);
(Continued)

(58) Field of Classification Search
CPC ......... E02F 9/2253; E02F 9/2079; E02F 9/26; B60K 28/165; F16H 59/50; F16H 61/472;
(Continued)

(56) References Cited

U.S. PATENT DOCUMENTS 6,424,902 B1 * 7/2002 Kuras .................. F16H 61/433
701/51
7,867,136 B2 1/2011 Schifferer
(Continued)

FOREIGN PATENT DOCUMENTS

DE 10 2007 030 168 A1 1/2009
DE 11 2008 000 712 T5 2/2010
(Continued)

OTHER PUBLICATIONS

German Office Action Corresponding to 10 2017 221 985.8 dated Oct. 15, 2018.
(Continued)

*Primary Examiner* — Justin Holmes
(74) *Attorney, Agent, or Firm* — Davis & Bujold PLLC; Michael J. Bujold

(57) ABSTRACT

A traction force limiting device for a working machine with a continuously variable transmission that comprises a variator for adjusting the rotational speed ratio of the transmission independently of the torque ratio of the transmission. The traction force limiting device has a traction force interface for providing information to determine a traction force of the working machine, a limit value interface for setting a traction force limit value of the working machine and a control interface for emitting a control signal to the variator. Additionally, the traction force limiting device has a computer unit designed, on a basis of information provided via the traction force interface, to determine the traction force, to compare the traction force determined with the (Continued)

traction force limit value set via the limit value interface, and to control the variator in such manner that the traction force does not exceed the traction force limit value.

11 Claims, 2 Drawing Sheets

(51) Int. Cl.
*F16H 59/50* (2006.01)
*F16H 59/14* (2006.01)
*E02F 9/20* (2006.01)
*E02F 9/26* (2006.01)
*B60K 28/16* (2006.01)

(52) U.S. Cl.
CPC .............. *E02F 9/26* (2013.01); *F16H 59/14* (2013.01); *F16H 59/50* (2013.01); *F16H 61/472* (2013.01); *F16H 2059/148* (2013.01); *F16H 2059/506* (2013.01)

(58) Field of Classification Search
CPC .............. F16H 59/14; F16H 2059/506; F16H 2059/148
See application file for complete search history.

(56) References Cited

U.S. PATENT DOCUMENTS

| | | |
|---|---|---|
| 7,987,941 B2 | 8/2011 | Shirao et al. |
| 8,241,174 B2* | 8/2012 | Wallner ................ B60W 10/02 477/5 |
| 9,255,639 B2 | 2/2016 | Dueckinghaus et al. |
| 9,845,008 B2 | 12/2017 | Brownell et al. |
| 2014/0121911 A1 | 5/2014 | Davis et al. |
| 2014/0200775 A1 | 7/2014 | Shirao |
| 2015/0226322 A1* | 8/2015 | Matsuo ................... F16H 59/40 701/62 |

FOREIGN PATENT DOCUMENTS

| | | |
|---|---|---|
| DE | 1 2007 002 112 B4 | 2/2016 |
| DE | 10 2016 216 588 A1 | 3/2017 |

OTHER PUBLICATIONS

International Search Report Corresponding to PCT/EP2018/080429 dated Feb. 1, 2019.
Written Opinion Corresponding to PCT/EP2018/080429 dated Feb. 1, 2019.
International Preliminary Examination Report Corresponding to PCT/EP2018/080429 dated Jan. 24, 2020.

* cited by examiner

TENSILE FORCE-LIMITING DEVICE FOR A WORKING MACHINE

This application is a National Stage completion of PCT/EP2018/080429 filed Nov. 7, 2018, which claims priority from German patent application serial no. 10 2017 221 985.8 filed Dec. 6, 2017.

FIELD OF THE INVENTION

The present invention relates to a traction force limiting device for a working machine, a working machine with a traction force limiting device of that type and a method for limiting the traction force of a working machine.

BACKGROUND OF THE INVENTION

Working machines, for example graders, can comprise a multi-step transmission which downshifts when the driving resistance increases in order to prevent stalling of the engine. Conventional multi-step transmissions show a traction force behavior such that a downshift is accompanied by an increase of the rotational speed ratio and an increase of the traction force. Depending for example on the condition of the ground, a downshift can result in a traction force increase so large that wheels of the working machine slip. Particularly in the case of graders such wheel-slip can have the result that an already flattened section has to be re-worked due to the wheel-slip. DE 10 2016 216 588 A1 describes a traction control system in which the drag force acting on a blade of the grader is determined by a plurality of sensors. Depending on the drag force determined, various actions can be initiated to avoid wheel-slip.

SUMMARY OF THE INVENTION

The present invention relates to a traction force limiting device for a working machine with a continuously variable transmission. The working machine can be a building machine, an agricultural machine, an aircraft towing machine or some other type of working machine. The continuously variable transmission makes it possible to adjust a transmission gear ratio in a continuously variable manner. The traction force is understood to be the force delivered by the drive-train to the wheels of the working machine. The traction force can be proportional to the drive torque of the continuously variable transmission. The transmission comprises a variator with which the torque ratio of the transmission can be adjusted independently of the rotational speed ratio. The rotational speed ratio of the transmission is understood to be the quotient of the drive input rotational speed and the drive output rotational speed. The torque ratio is understood to be the quotient of the drive output torque and the drive input torque. By means of the variator, the rotational speed ratio can be decoupled from the torque ratio of the transmission. The variator can be a hydraulic variator and/or an electric variator.

In addition the traction force limiting device comprises a traction force interface for the provision of information for determining an existing traction force of the working machine. Furthermore the traction force limiting device comprises a limit-value interface for setting a traction force limit value of the working machine. The traction force limit value is a traction force of the working machine which must not be exceeded at any operating point of the working machine. Moreover, the traction force limiting device comprises a control interface for emitting a control signal to the variator of the transmission. The variator can be controlled by the control signal.

In the context of the present invention, the interfaces can be an input/output device which, for example, can be designed for sending and receiving data flows in packaged or unpackaged form. The interfaces can be in the form of separate devices. Alternatively, some or all of the interfaces of the present invention can be realized by way of a single device, for example a bus.

In addition the traction force limiting device comprises a computer unit designed to determine the traction force applied on the basis of the information supplied via the interfaces. The information can include a drive output torque of the transmission detected by a drive output torque sensor. Likewise, the information can include data from which the traction force can be calculated by the computer unit by way of a computation model. A device of the computer unit for a particular function is understood to mean that the computer unit is specifically prepared, i.e. programmed, to carry out the particular function.

Moreover, the computer unit is designed to compare the traction force of the working machine as determined, with the traction force limit value provided by way of the limit-value interface. On the basis of the comparison, the computer unit controls the variator of the transmission via the control interface in such manner that the traction force does not exceed the traction force limit value.

By virtue of the traction force limiting device of the present invention, the traction force of a working machine can be kept below a limit value at all times. In that way slipping of the wheels of the working machine can be prevented in a simple and cost-efficient manner. In particular, to use the traction force limiting device no separate system of sensors is required. Instead, the device can be used with the sensors already present in the continuously variable transmission. This enables simple retrofitting of the traction force limiting device.

The traction force limiting device can comprise an adjustment device for adjusting the traction force limit value, which is connected to the limit-value interface. The adjustment device can be provided in the driver's cabin of the working machine. Thus, an operator of the working machine can adapt a traction force limit value to suit the environmental conditions, for example the condition of the ground.

The computer unit can be designed to control the variator in such manner that the rotational speed ratio of the transmission is increased without thereby changing the drive output torque of the transmission. Such a control measure can be carried out when a downshift of the transmission is necessary and the traction force determined corresponds to the traction force limit value. If a downshift of the transmission is necessary, for example in order to prevent stalling of the engine, an increase of the traction force above the limit value and thus slipping of the wheels can in that way be prevented.

When the transmission is upshifted the computer unit can control the variator in such manner that the rotational speed ratio is increased but the transmission drive output torque is not changed. Such a control measure can take place when the traction force determined corresponds to the traction force limit value. In that way, even when upshifting the transmission a traction force can be prevented from exceeding the traction force limit value.

The traction force limiting device can comprise a display interface for emitting a display signal to a display device. The display device can be a screen that can be provided in the driver's cabin of the working machine. The computer unit can be designed to emit a display signal via the display interface to the display device. The display signal can be emitted when a change of the rotational speed ratio of the transmission takes place without thereby changing the drive output torque of the transmission. Thus, it can be displayed to the operator of the working machine that the traction force limiting device is active and the traction force is limited. The operator can then initiate further actions to reduce the traction force. For example, if the working machine is a grader the blade can be raised in order to reduce the scraping depth. Alternatively or in addition, the blade can be adjusted so as to accelerate the discharge of material.

In addition the present invention relates to a continuously variable transmission for a working machine. The transmission comprises a sensor device for determining the drive output torque of the transmission. The sensor device can comprise one or more sensors. Furthermore, the transmission comprises a variator for adjusting a torque ratio of the transmission independently of the rotational speed ratio of the transmission. Moreover, the transmission comprises a traction force limiting device according to any of the above-described embodiments, wherein the sensor device is connected to the traction force interface and the control interface is connected to the variator. As regards the understanding of the individual features and their advantages, reference should be made to the above explanations.

The sensor device can be a device already provided during the manufacture of the transmission, which is required for the proper functioning of the transmission. Thus, the sensor device is not a component specifically provided for the traction force limiting device. Accordingly wheel-slip can be avoided in a simple and cost-efficient manner, since sensors already present in the transmission can be used for the control of the traction force limiting device.

The variator can be a hydraulic variator, which comprises a hydraulic pump and a hydraulic motor. Alternatively or in addition, the variator can be an electric variator which comprises a generator and an electric motor.

The continuously variable transmission can be a hydrostatic-mechanical power-split transmission, which makes it possible for fuel consumption to be low. Other transmissions having a variator are also conceivable.

In addition the present invention relates to a working machine with a continuously variable transmission according to any of the previously described embodiments. The working machine can be a grader or some other working machine. The present invention has a beneficial effect in the case of a grader, since wheel slip can incur substantial additional costs as indicated at the beginning.

Furthermore, the present invention relates to a method for limiting the traction force of a working machine comprising a continuously variable transmission with a variator. The variator enables the torque ratio of the transmission to be adjusted independently of the rotational speed ratio of the transmission. The method includes the setting of a traction force limit value and the determination of an existing traction force of the working machine. An existing traction force is understood to mean the traction force which at the time-point of the determination is applied at the wheels of the working machine. In addition the method includes comparing the existing traction force with the limit value of the traction force and adjusting the variator of the continuously variable transmission on the basis of the comparison. The variator is adjusted in such manner that the traction force of the working machine does not exceed the traction force limit value. As regards the understanding of the individual features, their advantages and possible further developments of the method, reference should be made to the above explanations in connection with the traction force limiting device and the continuously variable transmission.

DETAILED DESCRIPTION OF THE PREFERRED EMBODIMENTS

Figure 1:
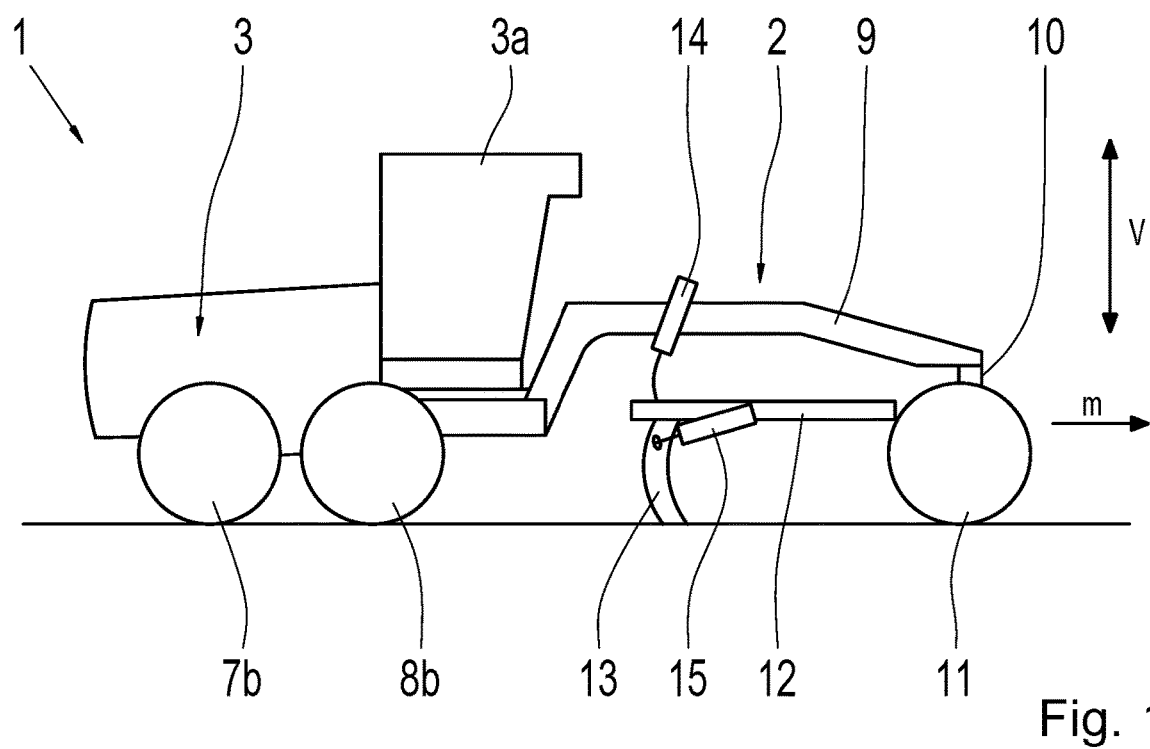
FIG. 1 shows schematically the structure of a grader, according to an embodiment of the present invention.

Below, an embodiment of a working machine 1 according to the present invention is described with reference to the drawings. The working machine 1 of this embodiment is a grader.

The grader 1 has a front section 2 and a rear section 3. The rear section 3 comprises a drive-train 4 with two rear axles 5, 6, to which in each case two wheels 7a, 7b and 8a, 8b respectively are fitted. Furthermore the rear section 3 comprises a driver's cabin 3a. The front section 2 comprises an elongated frame 9 which connects the rear section 3 to an axle section 10, on which a front axle with front wheels 11 are fitted.

In addition the grader 1 comprises a tie beam 12 mounted rotatably on the axle section 10, which is located under the frame 9. A blade 13 is mounted on the tie beam 12 so that it can rotate about a vertical axis V of the grader 1. The tie beam 12 with the blade 13 attached thereto can be adjusted in the vertical direction V of the grader 1 by means of a tie beam cylinder 14 mounted on the frame 9. Furthermore, by means of a rotational cylinder 15 the blade 13 can be rotated about the vertical axis V of the grader 1 in order to position the blade 13 obliquely relative to the travel direction of the grader 1.

Figure 2:
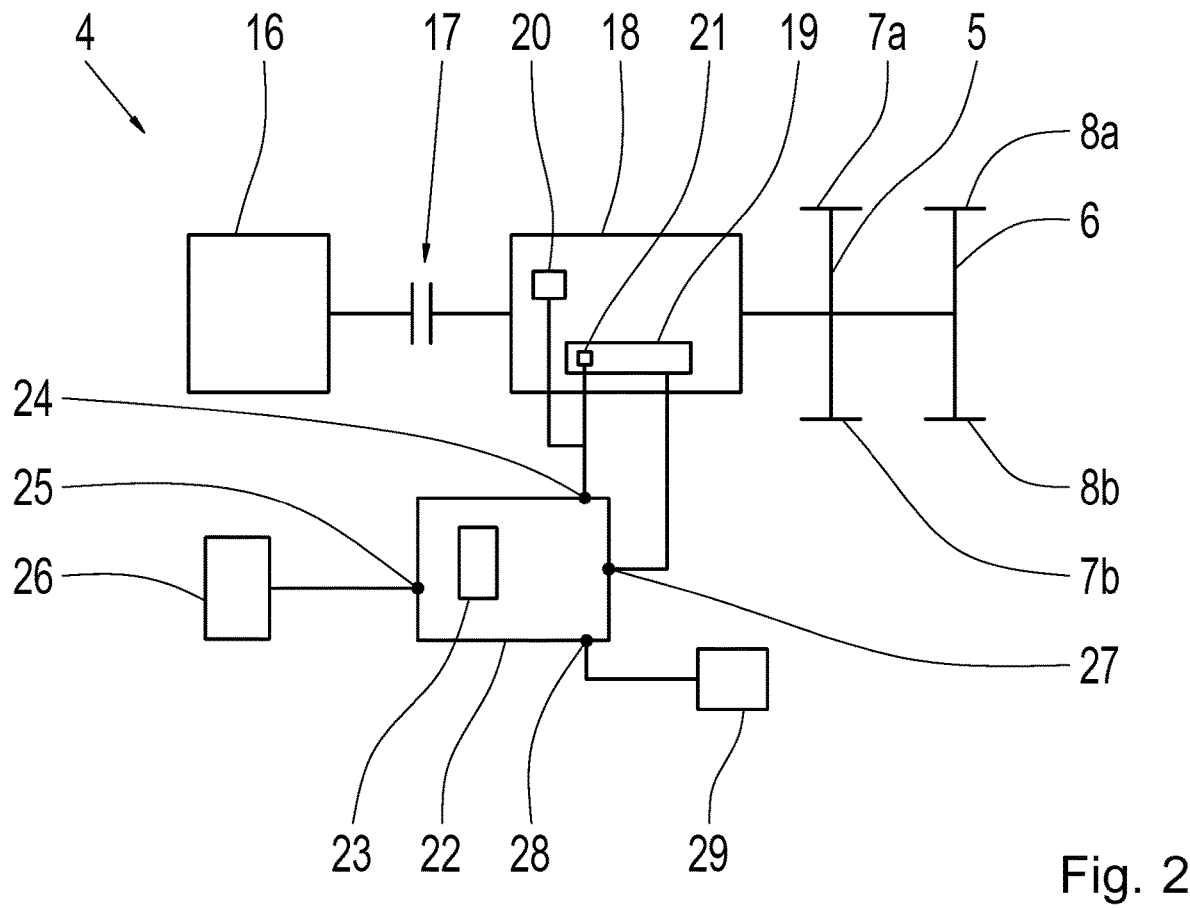
FIG. 2 shows the drive-train of the grader in FIG. 1.

As can be seen in FIG. 2, the drive-train 4 of the grader 1 comprises a drive machine 16 which in this embodiment is in the form of a diesel engine. The drive machine 16 is connected to a continuously variable transmission 18. The transmission is in the form of a so-termed Geared Neutral transmission, so that without a starting clutch 17 the vehicle can only can start off from rest by adjusting the variator 19. If the transmission is not in the form of a Geared Neutral transmission, then in addition to the continuously variable transmission a starter clutch 17 can be provided. As a rule, however, this starter clutch 17 is omitted and the vehicle is set in motion exclusively by means of the continuously variable transmission. In this embodiment the transmission is in the form of a hydrostatic-mechanical power-split transmission. The transmission 18 comprises a variator 19 which is realized by virtue of a combination of a hydraulic pump and a hydraulic motor. The power-split transmission 18 is connected to the rear axles 5, 6, so that via the drive-train 4 drive power of the drive machine 16 can be transmitted to the wheels 7a, 7b and 8a, 8b. The power-split transmission 18 comprises at least one rotational speed sensor 20 and at least one pressure sensor 21 provided in the variator 19.

Moreover, the drive-train 4 comprises a traction force limiting device 22. The traction force limiting device 22 comprises a computer unit 23 in the form of a microprocessor. The traction force limiting device 22 comprises a traction force interface 24 to which the rotational speed sensor 20 and the pressure sensor 21 are connected. Likewise, the traction force limiting device 22 comprises a limit-value interface 25 which is connected to an adjustment device 26. In this embodiment the adjustment device 26 is located in the driver's cabin 3a of the grader 1 and enables a driver of the vehicle to set a limit value for the traction force of the drive-train 4. Furthermore, the traction force limiting device 22 comprises a control interface 27 by way of which the variator 19 of the power-split transmission 18 can be controlled.

The computer unit 23 of the traction force limiting device 22 is designed to carry out the method described below with reference to FIGS. 3 and 4.

In a first step I a traction force limit value $F_{max}$ is set by means of the adjustment device 26. In the representation shown in FIG. 3, the limit value $F_{max}$ amounts to 70% of the maximum possible traction force.

In a subsequent step II, with reference to the rotational speed and the pressure provided by means of the traction force limiting device 22 via the traction force interface 24, for example the pressure in the variator, the drive output torque of the transmission 18 is determined by way of a computation model. From the drive output torque, the traction force applied at the wheels 7a, 7b and 8a, 8b respectively is determined.

In the next step III the traction force is compared with the traction force limit value $F_{max}$. If the traction force is lower than the limit value, the method reverts to step II. But if the traction force determined reaches the traction force limit value $F_{max}$, the variator 19 of the transmission 18 is controlled by the computer device 23 via the control interface 27 in a subsequent step IV, in such manner that the traction force limit value $F_{max}$ is not exceeded. Then, the process reverts to step II.

Figure 3:
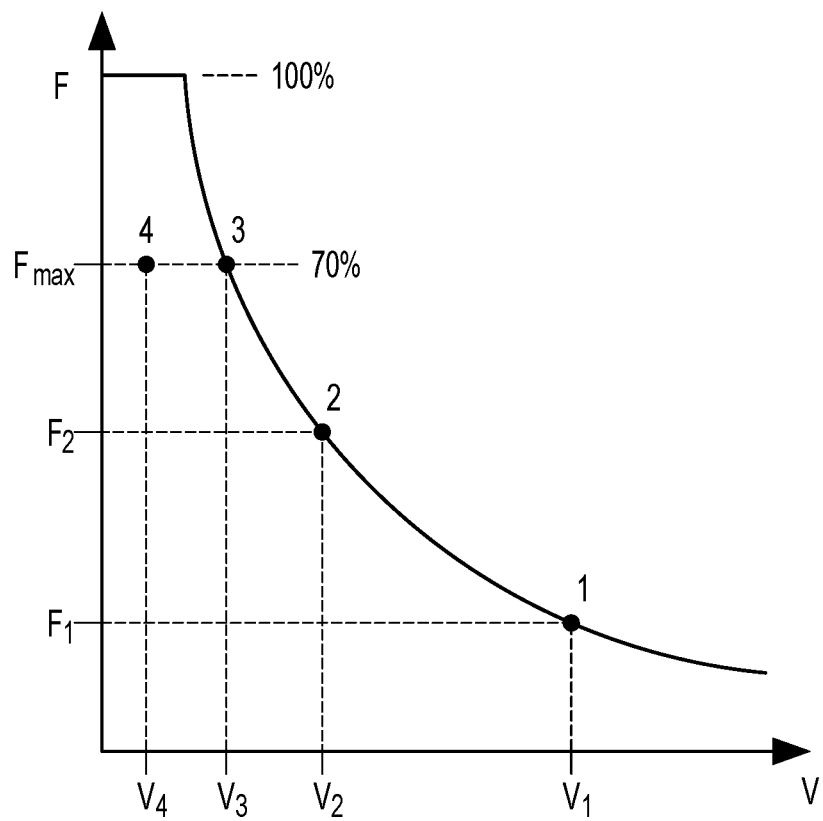
FIG. 3 shows the traction force variation of the drive-train in FIG. 2 as a function of the speed of the grader.
Figure 4:
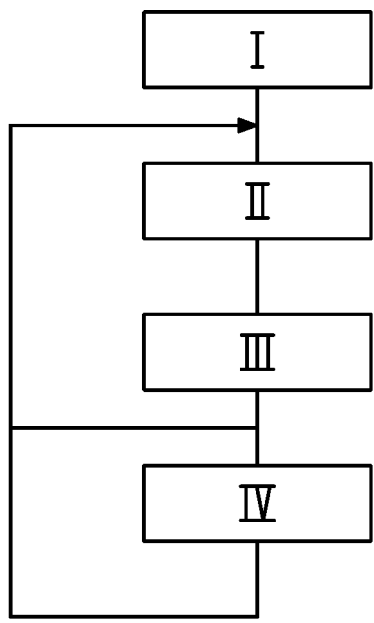
FIG. 4 shows a method for limiting the traction force of a grader in accordance with an embodiment of the present invention.

For example, if the grader is in a driving condition 1 shown in FIG. 3 and is traveling at a speed $v_1$ with a traction force $F_1$ and if the driving resistance then increases, in the transmission 18 the transmission ratio is adjusted continuously in order to prevent stalling of the engine. Thereby the transmission ratio is increased, which results in a driving condition 2 with lower speed $v_2$ and higher traction force $F_2$. If a further increase of the transmission ratio is required, the grader reaches a driving condition $F_3$ with traction force $F_{max}$ and speed $v_3$. If the transmission ratio is increased still further by adjusting the variator 19 of the transmission 18, the speed of the grader falls to a value $v_4$ at which the increase of the rotational speed ratio does not entail an increase of the traction force F. Instead, the traction force is limited to the limit value $F_{max}$ by appropriate control of the variator 19 by means of the traction force limiting device 22. If a reduction of the rotational speed ratio of the transmission 18 and thereby an acceleration of the vehicle is required, this also takes place without changing the traction force F until a speed $v_3$ is reached. At a higher speed v the transmission ratio change and therefore the acceleration of the vehicle again brings about a reduction of the traction force F. In that way, by virtue of the traction force limiting device 22 the traction force does not rise above the limit value $F_{max}$ at any operating point of the transmission 18.

INDEXES

1 Grader
2 Front section
3 Rear section
3a Driver's cabin
4 Drive-train
5, 6 Rear axles
7a, 7b, 8a, 8b Rear wheels
9 Frame
10 Axle section
11 Front wheels
12 Tie beam
13 Blade
14 Tie beam cylinder
15 Rotational cylinder
16 Drive machine
17 Starter clutch
18 Continuously variable transmission
19 Variator
20 Rotational speed sensor
21 Pressure sensor
22 Traction force limiting device
23 Computer unit
24 Traction force interface
25 Limit value interface
26 Adjustment device
27 Control interface
28 Display interface
29 Display device
$F_{max}$ Traction force limit value
I Set traction force limit value
II Determine existing traction force
III Compare existing traction force with traction force limit value
IV Adjust variator

The invention claimed is:

1. A traction force limiting device for a working machine having a continuously variable transmission, wherein the transmission comprises a controllable variator in order to adjust a torque ratio of the transmission independently of a rotational speed ratio of the transmission, and the traction force limiting device comprising:
   a traction force interface for providing information to determine a traction force of the working machine;
   a limit value interface for setting a traction force limit value of the working machine;
   a control interface for emitting a control signal to the variator of the transmission of the working machine;
   a computer unit designed to determine the traction force of the working machine on a basis of the information provided by the traction force interface, to compare the traction force of the working machine with the traction force limit value set by the limit value interface, and, on a basis of the comparison, to control the variator of the transmission, via the control interface, in such manner that the traction force of the working machine does not exceed the traction force limit value; and
   the computer unit is designed to control the variator in such manner that the rotational speed ratio of the transmission is increased without thereby changing drive output torque of the transmission when a continuous change of the transmission ratio of the transmission to a higher rotational speed ratio is required and the traction force determined corresponds to the traction force limit value.

2. The traction force limiting device according to claim 1, further comprising an adjustment device for setting the traction force limit value, wherein the adjustment device is connected to the limit value interface.

3. The traction force limiting device according to claim 1, wherein the computer unit is designed to control the variator in such a manner that the rotational speed ratio of the transmission is reduced without thereby changing the drive output torque of the transmission when an acceleration of the vehicle with the transmission by continuously varying the transmission ratio to a lower rotational speed ratio is required and the traction force determined corresponds to the traction force limit value.

4. The traction force limiting device according to claim 1, further comprising a display interface for emitting a display signal to a display device;
wherein the computer unit is designed to emit a display signal via the display interface to the display device when the variator is controlled, via the control interface, in such a manner that a change of the rotational speed ratio of the transmission takes place without thereby changing the drive output torque of the transmission.

5. A continuously variable transmission for a working machine, the transmission comprising:
a sensor device for determining a drive output torque of the transmission;
a controllable variator for adjusting a torque ratio of the transmission independently of a rotational speed ratio of the transmission; and
a traction force limiting device having a traction force interface for providing information for determining a traction force of the working machine, a limit value interface for setting a traction force limit value of the working machine, a control interface for emitting a control signal to the variator of the transmission of the working machine, a computer unit designed to determine the traction force of the working machine on a basis of the information provided by the traction force interface, to compare the traction force of the working machine with the traction force limit value set by the limit value interface, and, on a basis of the comparison, to control the variator of the transmission, via the control interface, in such a manner that the traction force of the working machine does not exceed the traction force limit value, and
the computer unit is designed to control the variator in such a manner that the rotational speed ratio of the transmission is increased without thereby changing drive output torque of the transmission when a continuous change of the transmission ratio of the transmission to a higher rotational speed ratio is required and the traction force determined corresponds to the traction force limit value; and
the sensor device is connected to the traction force interface and the variator is connected to the control interface.

6. The continuously variable transmission according to claim 5, wherein the sensor device is a device provided during manufacture of the transmission, which is required for proper functioning of the transmission.

7. The continuously variable transmission according to claim 5, wherein the transmission is a hydrostatic-mechanical power-split transmission.

8. The continuously variable transmission according to claim 7, wherein the sensor device comprises a rotational speed sensor and a pressure sensor.

9. A working machine having the continuously variable transmission according to claim 5.

10. The working machine according to claim 9, wherein the working machine is a grader.

11. A method for limiting traction force of a working machine having the continuously variable transmission including a sensor device for determining a drive output torque of the transmission; a controllable variator for adjusting a torque ratio of the transmission independently of a rotational speed ratio of the transmission; and a traction force limiting device having a traction force interface for providing information for determining a traction force of the working machine, a limit value interface for setting a traction force limit value of the working machine, a control interface for emitting a control signal to the variator of the transmission of the working machine, a computer unit designed to determine the traction force of the working machine on a basis of the information provided by the traction force interface, to compare the traction force of the working machine with the traction force limit value set by the limit value interface, and, on a basis of the comparison, to control the variator of the transmission, via the control interface, in such a manner that the traction force of the working machine does not exceed the traction force limit value, and the computer unit is designed to control the variator in such a manner that the rotational speed ratio of the transmission is increased without thereby changing drive output torque of the transmission when a continuous change of the transmission ratio of the transmission to a higher rotational speed ratio is required and the traction force determined corresponds to the traction force limit value; and the sensor device is connected to the traction force interface and the variator is connected to the control interface, the variator enabling the adjustment of the torque ratio of the transmission independently of the rotational speed ratio of the transmission, the method comprising:
setting the traction force limit value;
determining an existing traction force of the working machine;
comparing the existing traction force with the traction force limit value; and
adjusting the variator of the continuously variable transmission on the basis of the comparison, in such a manner that the traction force of the working machine does not exceed the traction force limit value.

* * * * *